Dec. 22, 1931.  M. REINSTEIN ET AL  1,837,335
FRUIT PEELING MACHINE
Filed Sept. 6, 1927   2 Sheets-Sheet 1
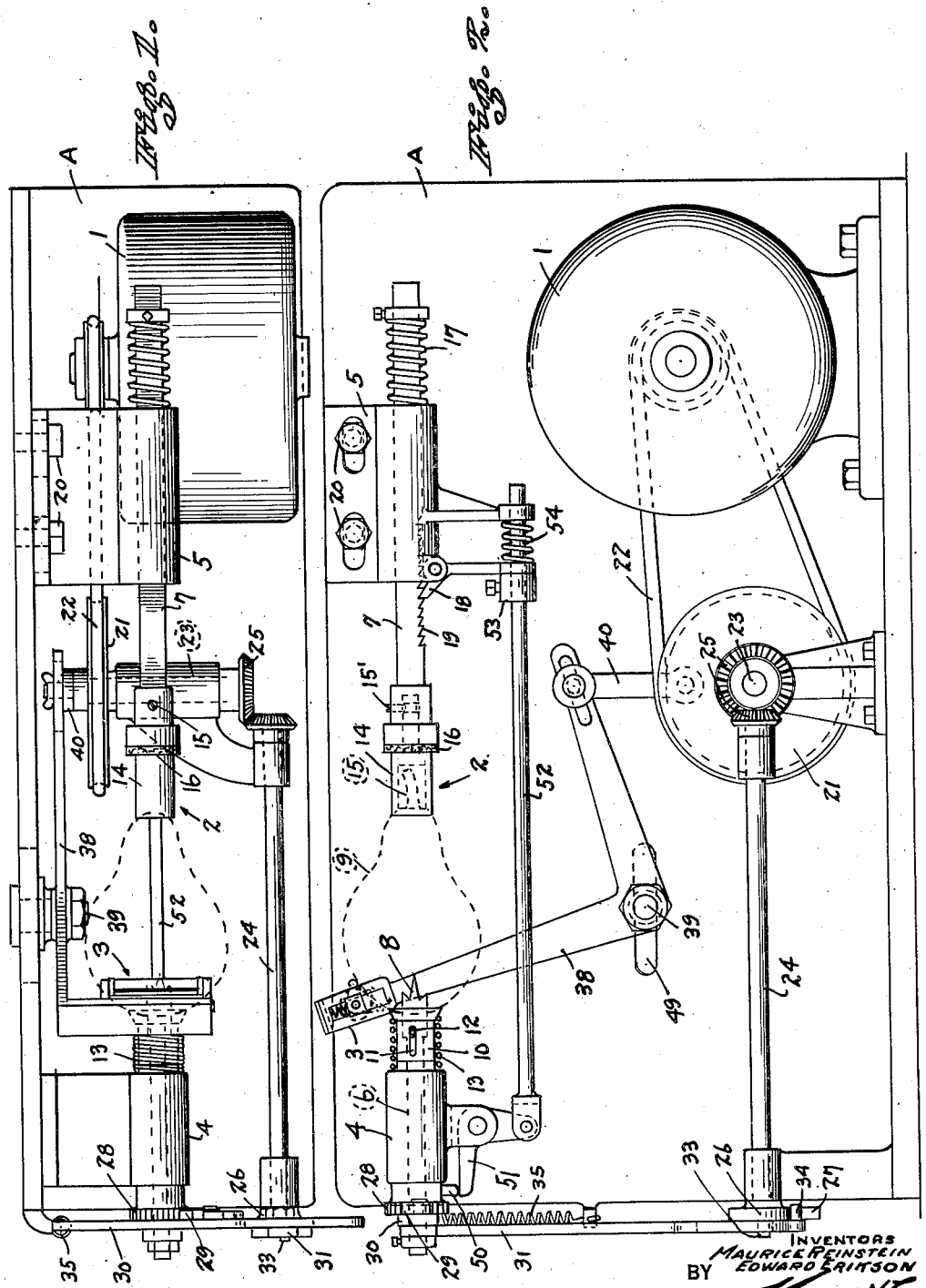
INVENTORS
MAURICE REINSTEIN
BY EDWARD ERIKSON
ATTORNEYS.

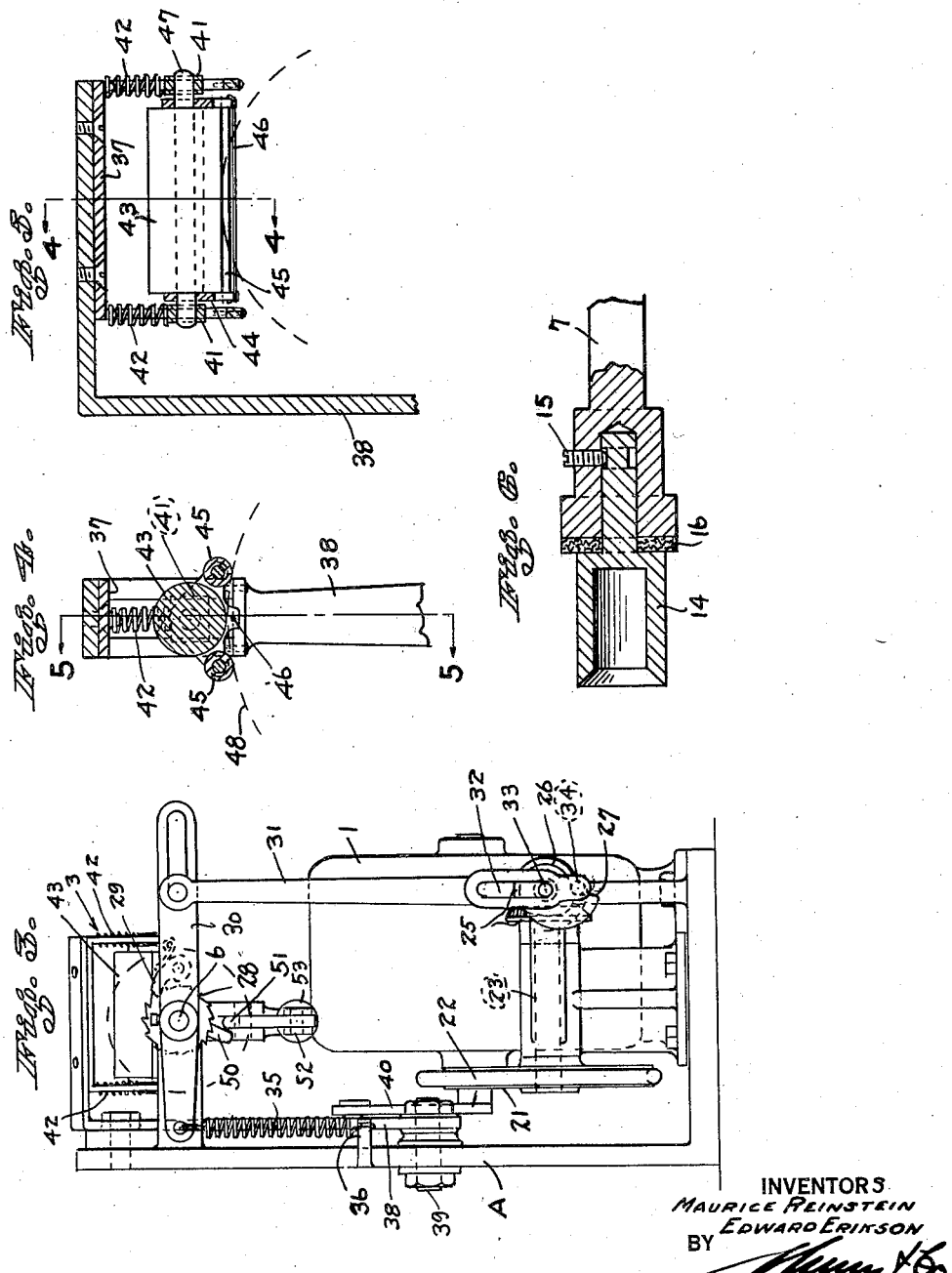

Patented Dec. 22, 1931

1,837,335

UNITED STATES PATENT OFFICE

MAURICE REINSTEIN AND EDWARD ERIKSON, OF SAN FRANCISCO, CALIFORNIA, ASSIGNORS TO AMERICAN MACHINE AND MANUFACTURING COMPANY, OF SAN FRANCISCO, CALIFORNIA, A CORPORATION OF CALIFORNIA

FRUIT PEELING MACHINE

Application filed September 6, 1927. Serial No. 217,726.

Our invention relates to improvements in fruit peeling machines and it consists in the combinations, constructions and arrangements hereinafter described and claimed.

An object of our invention is to provide a fruit peeling machine which is especially designed for peeling pears and has means for moving a knife longitudinally across the surface of the pear for severing the skin from the pear, the knife removing the skin while traveling across the surface of the pear in either direction. Novel means is also employed for causing the knife to cut skin-deep regardless of the contour of the pear.

A further object of our invention is to provide a device of the type described in which the pear is intermittently rotated through a small arc after the knife has completed one stroke and before the knife starts on another stroke, whereby the new surface of the pear is brought into operative position with respect to the knife.

A further object of our invention is to provide a device of the type described in which means is provided for supporting pears of various sizes and in which means is also provided for changing the stroke of the knife for accommodating pears of different sizes. Means is also provided for automatically releasing the pear after the same has been peeled.

Other objects and advantages will appear in the following specification, and the novel features of our invention will be particularly pointed out in the appended claims.

Our invention is illustrated in the accompanying drawings forming a part of this application, in which:

Figure 1 is a top plan view of the device.
Figure 2 is a side elevation of the device.
Figure 3 is an end elevation of the device.
Figure 4 is a section along the line 4—4 of Figure 5.
Figure 5 is a section along the line 5—5 of Figure 4, and
Figure 6 is a longitudinal section throughout a portion of the device.

In carrying out our invention we provide a frame A which is L-shaped and which carries a power source 1, a pear holding and rotating mechanism 2 and a cutting knife 3. These are the principal parts of the device and we will first describe the pear holding and rotating mechanism.

The frame A carries two sleeves 4 and 5 which in turn house a shaft 6 and a rack 7 respectively. The shaft 6 is rotatably mounted in the sleeve 4 and carries a tooth-shaped projection 8 that is adapted to imbed itself in the fruit 9.

A spring pressed member 10 is slidably mounted on the exposed portion of the shaft 6 and has a slot 11 in which a pin 12 is slidably mounted, this pin being carried by the shaft 6. A spring 13 urges the member 10 toward the right in Figure 2 and causes the member to bear against the fruit 9. The member will eject the fruit from the prong 8 as soon as the opposite end of the fruit is free from the supporting mechanism.

The rack 7 carries the mechanism for supporting the opposite end of the fruit and a sectional view of this mechanism is shown in Figure 6. It will be noted from this figure that the rack 7 rotatably carries a cup-shaped member 14 which receives the stem 15 of the fruit 9 and bears against the fruit for keeping it up against the member 10. A set screw 15' locks the cup 14 to the rack 7 yet permits rotation of the cup with respect to the rack. A fiber washer 16 is disposed between the cup and the rack for permitting the ready rotation of the cup.

The rack 7 is urged to the right in Figure 2 by means of a spring 17. A pawl 18 engages with teeth 19 on the rack 7 and normally holds the rack in proper position so that the cup 14 will bear against the pear 9. The sleeve 5 is adjustably connected to the frame A by bolts 20.

Having described the mechanism for supporting the pear 9, we will now describe the means for intermittently rotating the pear through a number of small arcs until the pear has been completely rotated through one revolution. The power source in the present instance comprises a motor 1 which is connected to an eccentric 21 by means of a belt or chain 22. It is obvious that if a greater speed reduction is desired, a gear reduction may be substituted for the chain 22. The eccentric 21 is mounted upon a shaft 23 which in turn is operatively connected to a shaft 24 (see Figure 2) by beveled gears 25, these gears being of a ratio to rotate the shaft 24 at twice the speed of the shaft 23. Figure 3 shows how the shaft 24 carries a cam 26 that has a stepped portion 27.

Connections between the cam 26 and the shaft 6 are provided by a ratchet 28 which is rigidly secured to the shaft 6, a pawl 29, an arm 30 rockably mounted on the shaft 6 and carrying the pawl 29, a link 31 having a slot 32 in one end thereof and a pin 33 carried by the cam 26 and slidably mounted in the slot 32. The pin 33 is axially aligned with the shaft 24 and may form an extension of the shaft. A second pin 34 is secured to the link 31 and bears against the periphery of the cam 26.

From this construction, it will be observed that a rotation of the shaft 24 will rotate the cam 26 in a clockwise direction and will slowly move the link 31 downwardly (see Figure 3) until the pin 34 reaches the step 27. During this movement the pawl 29 is idly moved over the ratchet 28 and a spring 35 is placed under tension, the spring having its ends connected to the arm 30 and to a projection 36 carried by the frame A. When the pin 34 is released by the step 27 the arm 30 will be quickly swung by the spring 35, and the pawl 29 will engage with the ratchet 28 for quicky swinging the pear through a small arc. This swinging of the pear is to bring unpeeled portion of the fruit into a position where the knife will peel this portion of the fruit.

We will now describe the construction of the knife indicated generally at 3. Figures 4 and 5 show how the knife frame 37 is carried by a bell crank lever 38 and Figure 2 shows how the bell crank lever is pivotally and adjustably secured to the frame A at 39 and is connected by a link 40 to the eccentric 21. Returning to the frame 37 it will be noted that this frame is U-shaped and slidably carries bearings 41 which springs 42 urge in a downwardly direction. The bearings 41 rotatably carry a roller 43 and also carry a carriage 44 which has triangular-shaped ends (see Figure 4) and which carries idler rollers 45 that are positioned adjacent to the roller 43. A cutting knife 46 having two cutting edges is carried by the carriage 44 and is adapted to oscillate about the shaft 47 as a pivot.

The springs 42 keep the three rollers 43, 44 and 45 contacting with the surface 48 of the fruit. This is true regardless of the curvature of the fruit. These rollers determine the depth which the knife 46 enters the fruit and this depth may be adjusted so that only the skin is removed from the fruit.

From the foregoing description of the various parts of the device, the operation thereof may be readily understood.

The fruit 9 is impinged upon the prong 8 and the rack 7 is relased from the pawl 18 so that the cup 14 can receive the stem end of the pear. The rack 7 is swung into engagement with the rack 19 whereby the cup 14 is held in adjusted position. The pivot point 39 is moved in the slot 49 so that the pivot is approximately midway between the adjacent ends of the members 10 and 14. The roller 43 (see Figure 5) has enough movement radially with respect to the pivot 39 (see Figure 2) to permit the roller to contact with the surface of the fruit regardless of the shape of the latter. The motor 1 is now started and the knife 46 will be reciprocated across the fruit from end to end of the latter and will peel a portion of the skin from the fruit during each stroke. After the knife has completed one stroke the fruit will be quickly rotated through a small arc by the cam 26 and the ratchet and pawl 28 and 29 in the manner already described. This brings a new portion of the fruit to inoperative relation with the knife. The reason for the shaft 23 rotating at one-half the speed of the shaft 24 is that the pear 9 must be rotated through two small arcs for each revolution of the eccentric 21 because the cutter 46 makes two complete strokes for each complete revolution of the eccentric.

We provide means for automatically releasing the fruit after the shaft has made one complete revolution, or in other words, after the fruit has been entirely peeled. This mechanism is shown in Figure 2 and also in Figure 3. The shaft 6 carries the finger 50 which engages with a trip 51 after the shaft has made one complete revolution. The trip 51 moves a rod 52 (see Figure 2) and the rod carries a collar 53 that moves the pawl 18 into released position when the trip 51 is actuated. The freeing of the pawl 18 permits the spring 17 to move the cup 14 away from the fruit. This permits the member 10 to eject the fruit from the prong 8. A spring 54 returns the rod 52 to normal position and causes the pawl 18 to again engage with the rack 7. The device is now ready for another piece of fruit.

Although we have shown and described one embodiment of our invention, it is to be understood that the same is susceptible of various changes and we reserve the right to employ such changes as may come within the scope of the appended claims.

We claim:

1. A fruit peeling device comprising a frame, means for supporting a piece of fruit, a cutter, means for moving the cutter longitudinally along the fruit and removing the skin therefrom, means for intermittently rotating the fruit, for bringing uncut portions thereof into operative position with respect to the cutter after each stroke of the cutter, and means for automatically releasing the fruit from the fruit supporting means when the fruit supporting means has made one complete revolution.

2. In a device of the type described, a fruit supporting means comprising two movable members adapted to engage with the ends of a piece of fruit, means for rotating said members for rotating the fruit and means for releasing said members for releasing the fruit, said last named means including a spring for urging one of said members away from said fruit and a pawl swingable into inoperative position for releasing said spring actuated member.

3. In a device of the type described, fruit supporting members, a cutter, an arm for supporting said cutter, means for adjusting the pivot point of said arm for positioning the pivot point midway between the ends of the fruit supporting members, and means for rocking said arm.

4. In a device of the type described, a cutter carrying frame, a cutter having two cutting edges and being movably carried by said frame, supporting means for urging said cutter in one direction and idler rollers co-operating with said cutter and bearing against the surface of a fruit for determining the depth at which the cutter enters the fruit, means for reciprocating said cutter for causing it to cut during its movements in both directions.

5. In a fruit peeling machine, a fruit-engaging prong, a spring-pressed fruit ejecting member slidable on said prong and being movable to the extreme end of the prong, means for supporting the opposite end of the fruit, a spring for urging said means away from the fruit, and means for automatically releasing said fruit-engaging means.

6. In a fruit peeling machine, a knife carrier movable over the surface of the fruit in two directions, a double edge blade for cutting during the movement of the blade in both directions, means carried by said carrier for urging said blade into the fruit and idler rollers mounted on each side of said blade and contacting with the fruit for determining the cutting depth of the knife.

7. In a fruit peeling machine, a prong for holding one end of the fruit, a retractable member for holding the other end of the fruit, and a spring-pressed member encircling the prong and bearing on the fruit for ejecting the same when the retractable member is retracted.

8. In a fruit peeling machine, a prong for holding one end of the fruit, a retractable member for holding the other end of the fruit, and a spring-pressed member encircling the prong and bearing on the fruit for ejecting the same when the retractable member is retracted, the spring-pressed member having means associated therewith for limiting its movement relative to the prong.

9. In a fruit peeling machine, a revolvable means for supporting a fruit, a lever mounted co-axially therewith, a link operating the lever, a cam actuating the link for gradual motion in one direction and allowing of instantaneous motion in the other direction, a spring for effecting the latter motion, and means for transmitting the latter motion to the fruit-supporting means.

10. In a fruit peeling device, a frame having a blade supported therein, slidable supporting means for the frame having spring means urging the blade into the fruit, and a roller mounted rearwardly of the blade for limiting the depth of the cut.

11. In a fruit peeling device, a frame having a blade supported therein, slidable means pivotally supporting the frame and having spring means urging the blade into the fruit, a roller mounted rearwardly of the blade for limiting the depth of the cut, and additional rollers mounted on opposite sides of the first roller for guiding the frame.

MAURICE REINSTEIN.
EDWARD ERIKSON.